United States Patent
Lee et al.

(10) Patent No.: US 12,407,064 B2
(45) Date of Patent: Sep. 2, 2025

(54) BATTERY PACK COMPRISING EXTINGUISHMENT UNIT

(71) Applicant: LG ENERGY SOLUTION, LTD., Seoul (KR)

(72) Inventors: Jin-Kyu Lee, Daejeon (KR); Goan-Su Jung, Daejeon (KR); Jun-Min Lee, Daejeon (KR); Gyong-Jin Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/739,734

(22) Filed: Jun. 11, 2024

(65) Prior Publication Data

US 2024/0332729 A1 Oct. 3, 2024

Related U.S. Application Data

(63) Continuation of application No. 17/628,055, filed as application No. PCT/KR2020/010509 on Aug. 7, 2020, now Pat. No. 12,034,177.

(30) Foreign Application Priority Data

Aug. 8, 2019 (KR) .......................... 10-2019-0096939

(51) Int. Cl.
*H01M 50/383* (2021.01)
*A62C 3/16* (2006.01)
(Continued)

(52) U.S. Cl.
CPC ............. *H01M 50/383* (2021.01); *A62C 3/16* (2013.01); *A62C 37/40* (2013.01);
(Continued)

(58) Field of Classification Search
CPC ............. H01M 50/383; H01M 50/251; H01M 50/209; H01M 50/375; H01M 10/627;
(Continued)

(56) References Cited

U.S. PATENT DOCUMENTS 5,824,432 A 10/1998 Currle
2011/0027632 A1 2/2011 Higashino et al.
(Continued)

FOREIGN PATENT DOCUMENTS

CN 204158920 U 2/2015
CN 104667459 A 6/2015
(Continued)

OTHER PUBLICATIONS

Extended European Search Report for European Application No. 20850852.3, dated Nov. 21, 2022.
(Continued)

*Primary Examiner* — Karie O'Neill Apicella
(74) *Attorney, Agent, or Firm* — Birch, Stewart, Kolasch & Birch, LLP

(57) ABSTRACT

A battery pack includes at least two battery modules arranged in one direction; and a fire extinguisher having a linear temperature sensor partially extending linearly along the at least two battery modules and configured to sense whether at least one of the at least two battery modules has a temperature over a predetermined temperature, a fire extinguishing tank configured to accommodate a fire extinguishing agent therein, a pipe connected to the fire extinguishing tank to supply the fire extinguishing agent from the fire extinguishing tank to each of the at least two battery modules, and a valve opened to supply the fire extinguishing agent from the fire extinguishing tank to the battery module over the predetermined temperature.

10 Claims, 10 Drawing Sheets

(51) Int. Cl.
*A62C 37/40* (2006.01)
*H01M 10/48* (2006.01)
*H01M 10/627* (2014.01)
*H01M 10/6567* (2014.01)
*H01M 50/209* (2021.01)
*H01M 50/251* (2021.01)
*H01M 50/375* (2021.01)

(52) U.S. Cl.
CPC ....... *H01M 10/482* (2013.01); *H01M 10/486* (2013.01); *H01M 10/627* (2015.04); *H01M 10/6567* (2015.04); *H01M 50/209* (2021.01); *H01M 50/251* (2021.01); *H01M 50/375* (2021.01); *H01M 2200/10* (2013.01); *H01M 2220/10* (2013.01)

(58) Field of Classification Search
CPC ........... H01M 10/6567; H01M 10/482; H01M 10/486
See application file for complete search history.

(56) References Cited

U.S. PATENT DOCUMENTS

| | | |
|---|---|---|
| 2011/0189511 A1 | 8/2011 | Yoon |
| 2012/0273240 A1 | 11/2012 | Smith et al. |
| 2014/0186668 A1 | 7/2014 | Jung et al. |
| 2015/0311572 A1 | 10/2015 | Sung et al. |
| 2017/0256831 A1 | 9/2017 | Hong et al. |
| 2017/0301967 A1 | 10/2017 | Kim |
| 2021/0060368 A1 | 3/2021 | Jiang et al. |

FOREIGN PATENT DOCUMENTS

| | | | | |
|---|---|---|---|---|
| CN | 109513135 A | * | 3/2019 | ............... A62C 2/06 |
| EP | 2 369 656 A1 | | 9/2011 | |
| EP | 4 053 981 A1 | | 9/2022 | |
| JP | 2004-95361 A | | 3/2004 | |
| JP | 2006-100156 A | | 4/2006 | |
| JP | 2009-48588 A | | 3/2009 | |
| JP | 5331517 B2 | | 10/2013 | |
| JP | 6103887 B2 | | 3/2017 | |
| KR | 10-2007-0006000 A | | 1/2007 | |
| KR | 10-0778435 B1 | | 11/2007 | |
| KR | 10-2009-0051889 A | | 5/2009 | |
| KR | 10-2011-0090236 A | | 8/2011 | |
| KR | 10-1340365 B1 | | 12/2013 | |
| KR | 10-1424704 B1 | | 7/2014 | |
| KR | 10-1652975 B1 | | 9/2016 | |
| KR | 10-1829093 B1 | | 3/2018 | |
| KR | 10-1918022 B1 | | 11/2018 | |
| KR | 10-1939812 B1 | | 1/2019 | |
| KR | 10-2019-0071455 A | | 6/2019 | |

OTHER PUBLICATIONS

Indian Office Action for Indian Application No. 202217009616, dated Jul. 21, 2023, with English translation.
International Search Report for PCT/KR2020/010509 mailed on Dec. 1, 2020.
Australian Office Action for Australian Application No. 2020324313, dated Jun. 26, 2025.

* cited by examiner

BATTERY PACK COMPRISING EXTINGUISHMENT UNIT

CROSS-REFERENCE TO RELATED APPLICATIONS

This application is a Continuation of U.S. application Ser. No. 17/628,055, filed on Jan. 18, 2022, which is the National Phase of PCT/KR2020/010509, filed on Aug. 7, 2020, which claims priority under 35 U.S.C. 119(a) to Korean Patent Application No. 10-2019-0096939, filed on Aug. 8, 2019 in the Republic of Korea, all of which are hereby expressly incorporated by reference in their entirety into the present application.

TECHNICAL FIELD

The present disclosure relates to a battery pack including a fire extinguishing unit, and more particularly, to a battery pack having a reduced risk of secondary ignition or explosion.

BACKGROUND ART

Secondary batteries commercialized at the present include nickel cadmium batteries, nickel hydrogen batteries, nickel zinc batteries, and lithium secondary batteries. Among them, lithium secondary batteries are in the spotlight due to free advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, namely a battery pouch exterior, for hermetically storing the electrode assembly together with an electrolyte.

Recently, secondary batteries are widely used not only in small devices such as portable electronic devices, but also in middle-sized or large-sized devices such as vehicles and energy storage systems. When used in the middle-sized or large-sized device, a large number of secondary batteries are electrically connected to increase capacity and output. In particular, pouch-type secondary batteries are widely used in the middle-sized or large-sized devices since they may be easily stacked.

Meanwhile, recently, as the need for a large-capacity structure increases along with the use as an energy storage source, the demand for a battery pack including a plurality of secondary batteries electrically connected in series and/or in parallel, and a battery module accommodating the secondary batteries therein, and a battery management system (BMS) is increasing.

In addition, the battery pack generally includes an outer housing made of a metal material to protect or store the plurality of secondary batteries from an external shock. Meanwhile, the demand for high-capacity battery packs is increasing recently.

However, since the conventional battery pack or the conventional battery rack has a plurality of battery modules, if the secondary batteries of each battery module generates thermal runaway to cause ignition or explosion, heat or flame may be transferred to neighboring secondary batteries to cause secondary explosions, so efforts to prevent secondary ignition or explosion are increasing.

Accordingly, it is necessary to develop a fast and complete fire extinguishing technology to take immediate action when thermal runaway occurs in some secondary batteries in the battery pack or the battery rack.

DISCLOSURE

Technical Problem

The present disclosure is designed to solve the problems of the related art, and therefore the present disclosure is directed to providing a battery pack, which reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
at least two battery modules arranged in one direction; and
a fire extinguisher having a linear temperature sensor partially extending linearly along the at least two battery modules and configured to sense whether at least one of the at least two battery modules has a temperature over a predetermined temperature, a fire extinguishing tank configured to accommodate a fire extinguishing agent, a pipe connected to the fire extinguishing tank to supply the fire extinguishing agent from the fire extinguishing tank to each of the at least two battery modules, and a valve to supply the fire extinguishing agent from the fire extinguishing tank to the at least one battery module having a temperature over the predetermined temperature.

Also, each of the at least two battery modules may have a gas passage configured to discharge a gas generated therein to the outside, and a plurality of gas discharge holes formed at an end of the gas passage to communicate with the outside.

A part of the linear temperature sensor may be located at an outer side of the two or more battery modules to face the gas discharge holes respectively provided to the at least two battery modules.

Moreover, the pipe may include a common pipe connected to an outlet hole of the fire extinguishing tank through which the fire extinguishing agent is output, and a distribution pipe having a distributed structure to be connected from the common pipe to an inlet hole of each of the at least two battery modules through which the fire extinguishing agent is input.

In addition, the valve may include a common valve located in the common pipe to open or close the common pipe, and a distribution valve located in the distribution pipe to open or close the distribution pipe.

Further, the distribution valve may be a passive valve configured to be opened to inject the fire extinguishing agent into the battery module over the predetermined temperature.

Also, at least a part of the passive valve may be inserted into the inlet hole, wherein the inlet hole is formed to communicate with the gas passage provided to the battery module.

In addition, the common valve may be an active valve configured to be opened when the linear temperature sensor senses the at least one battery module having a temperature over the predetermined temperature.

Further, the fire extinguisher may further include a location calculating part configured to receive a signal from the linear temperature sensor and calculate a location of the at least one battery module having a temperature over the predetermined temperature.

Also, each of the at least two battery modules may have two or more inlet holes.

Moreover, the distribution pipe may be two distribution pipes respectively connected to the two or more inlet holes.

In addition, a first distribution pipe of the two distribution pipes may include a passive valve configured to be opened when the at least one battery module is heated over the predetermined temperature.

Further, a second distribution pipe of the two distribution pipes may include an active valve configured to be opened when the at least one battery module is heated over the predetermined temperature.

Also, the fire extinguisher may further include a smoke sensor configured to sense a smoke discharged from the at least two battery modules.

Moreover, in another aspect of the present disclosure, there is also provided a battery rack, comprising: a battery pack; and a rack case configured to accommodate the battery pack.

In addition, in another aspect of the present disclosure, there is also provided an energy storage system, comprising two or more battery racks.

Advantageous Effects

According to an embodiment of the present disclosure, since the battery pack includes the linear temperature sensor linearly extending along at least two battery modules, it is possible to reduce the manufacturing cost of the battery pack.

That is, when a plurality of temperature sensors is provided in the prior art, a plurality of temperature sensors and separate signal wires for connecting the plurality of temperature sensors are required, which increases the manufacturing cost due to high material cost and long installation work. Meanwhile, the battery pack of the present disclosure uses only one linear temperature sensor to detect the temperature of the plurality of battery modules, so a separate signal wire is not required and easy installation is secured due to a light and flexible design. Thus, the manufacturing cost of battery pack may be greatly reduced.

Moreover, the linear temperature sensor is useful for setting a plurality of points for more accurate temperature sensing even for one battery module. Accordingly, in the present disclosure, it is possible to greatly reduce the failure rate in detecting the occurrence of fire in the battery module.

In addition, according to an embodiment of the present disclosure, if a part of the linear temperature sensor is located at the outer side of the two or more battery modules to face the gas discharge hole provided to each of the at least two battery modules, when thermal runaway occurs at the cell assembly of the battery module, hot air with elevated temperature is discharged through the gas discharge hole or hot gas generated during ignition of the cell assembly is discharged through the gas discharge hole, so the linear temperature sensor may sense the hot air or gas with fast response. Accordingly, it is possible to increase the safety by rapidly responding to the thermal runaway of the battery pack according to the present disclosure.

In addition, according to an embodiment of the present disclosure, since at least a part of the passive valve is inserted into the inlet hole perforated to communicate with the gas discharge passage provided to the battery module, when thermal runaway occurs, the passive valve opens so that the fire extinguishing agent may be injected individually only to the battery module at which the thermal runaway occurs. Moreover, since the fire extinguishing agent may be injected directly into the battery module, rather than to an outside thereof, it is possible to effectively extinguish and cool the fire of the battery module at which thermal runaway occurs.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
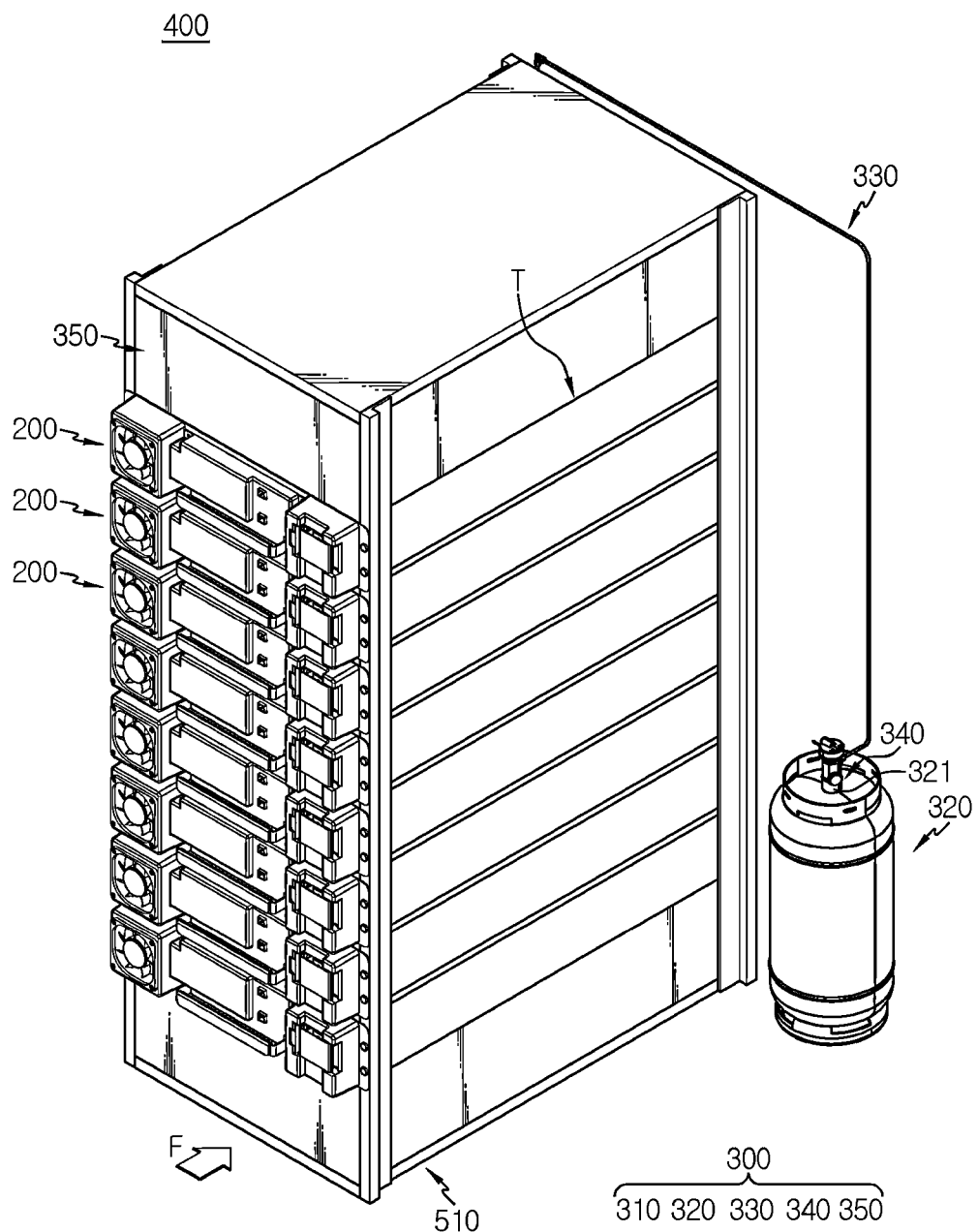
FIG. 1 is a front perspective view schematically showing a battery pack according to an embodiment of the present disclosure.
Figure 2:
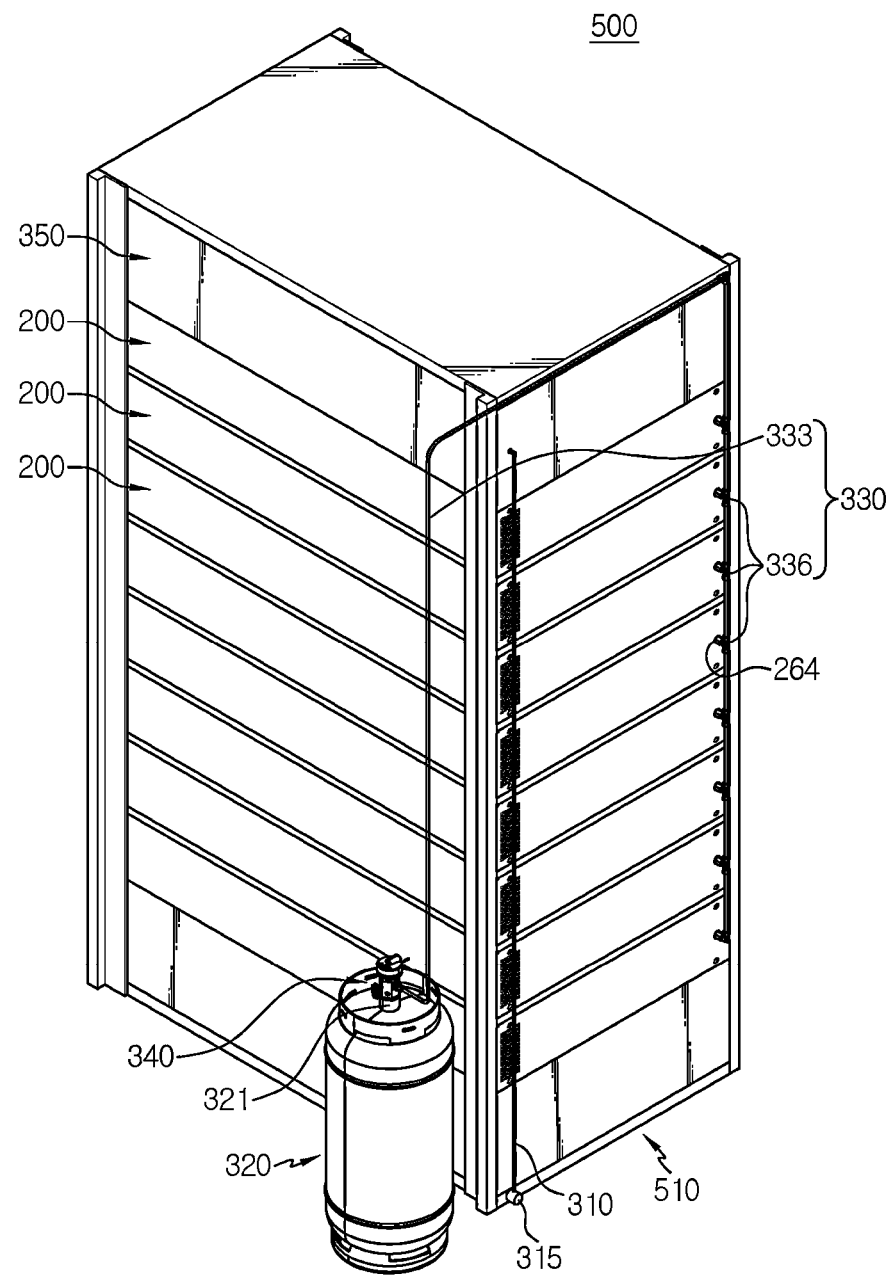
FIG. 2 is a rear perspective view schematically showing the battery pack according to an embodiment of the present disclosure.

FIG. 1 is a front perspective view schematically showing a battery pack according to an embodiment of the present disclosure. FIG. 2 is a rear perspective view schematically showing the battery pack according to an embodiment of the present disclosure. Also, FIG. 3 is a diagram schematically showing components of the battery pack according to an embodiment of the present disclosure.

Figure 3:
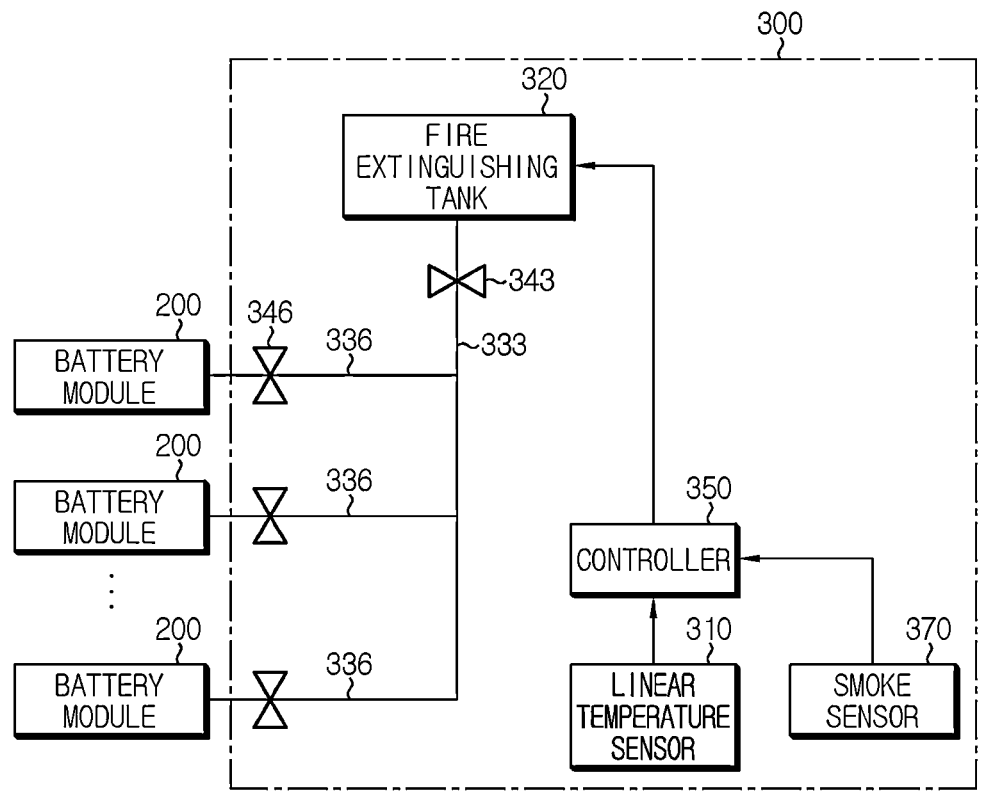
FIG. 3 is a diagram schematically showing components of the battery pack according to an embodiment of the present disclosure.

Referring to FIGS. 1 to 3, a battery pack 400 according to an embodiment of the present disclosure includes at least two battery modules 200 arranged in one direction, and a fire extinguishing unit 300 configured to extinguish a fire of the battery module 200.

Specifically, the fire extinguishing unit 300 may include a linear temperature sensor 310, a fire extinguishing tank 320, a pipe 330, and a valve 340.

First, the fire extinguishing tank 320 may contain a fire extinguishing agent (not shown) therein. For example, the fire extinguishing agent may be a concentrated solution of an inorganic salt such as potassium carbonate, a chemical bubble, an air bubble, carbon dioxide, or water. In addition, the fire extinguishing tank 320 may have a compressed gas therein to inject or move the fire extinguishing agent at an appropriate pressure along the pipe 330. For example, the capacity of the fire extinguishing tank 320 may be 59 L, the compressed gas may be nitrogen of 8 bar, and the fire extinguishing agent may be 40 L of water. Here, if the fire extinguishing agent is water, when the fire extinguishing agent is sprayed into the battery module 200, the fire extinguishing agent has a heat shielding effect together with the fire extinguishing and cooling effect, so it is effective in preventing thermal propagation when high-temperature gas and flame are generated due to thermal runaway. As a result, it is possible to effectively prevent a fire or thermal runaway from propagating among the plurality of battery modules 200.

The pipe 330 may be configured to be connected to supply the fire extinguishing agent to each of the at least two battery modules 200. For example, the pipe 330 may be made of a material that is not corroded by water. For example, the pipe 330 may be made of stainless steel. One end of the pipe 330 may be connected to an outlet hole 321 of the fire extinguishing tank 320. The other end of the pipe 330 may have a shape extending to the inside of each of the at least two battery modules 200.

For example, the pipe 330 may include a common pipe 333 connected to the outlet hole 321 of the fire extinguishing tank 320 through which the fire extinguishing agent is discharged, a distribution pipe 336 having a distributed structure to be connected to an inlet hole 264 provided in each of the at least two battery modules 200 from the common pipe 333. For example, as shown in FIG. 2, the pipe 330 may include one common pipe 333 connected to the outlet hole 321 of the fire extinguishing tank 320, and eight distribution pipes 336 branched from the common pipe 333. In addition, the eight distribution pipes 336 may be configured to be connected to the inlet holes 264 of eight battery modules 200.

In addition, the valve 340 may be configured to be opened to supply the fire extinguishing agent from the fire extinguishing tank 320 to a battery module 200 over a predetermined temperature through the pipe 330. Specifically, the valve 340 may be an active valve capable of controlling the opening and closing of the valve 340 by receiving a signal from the fire extinguishing unit 300. More specifically, the active valve may be a control valve, a motor-operated valve, a solenoid valve, or a pneumatic valve.

In addition, the linear temperature sensor 310 may be configured to sense whether at least one of the at least two battery modules 200 has a temperature over the predetermined temperature.

For example, the linear temperature sensor 310 may be configured to melt when a heat sensing material coated on two wires reaches a temperature higher over a reference temperature, to cause a short circuit between the two wires, thereby emitting a fire or overheat signal. For example, the heat sensing material may be a thermoplastic resin that melts at 70° C. to 100° C. For example, the thermoplastic resin may be a polyester resin or an acrylic resin. Additionally, the linear temperature sensor 310 may further include an insulating coating material configured to surround the heat sensing material. The coating material may include polyvinyl chloride.

In addition, the linear temperature sensor 310 may have a structure extending linearly along at least two battery modules 200 arranged in one direction. For example, as shown in FIG. 2, the battery pack 400 may include eight battery modules 200 arranged in a vertical direction. The linear temperature sensor 310 may be configured so that one end thereof is connected to the controller 350 and extends downward along the eight battery modules 200 arranged in the vertical direction, and the other end thereof is connected to a resistor 315 at a distal end. At this time, a bracket (not shown) and a fixing buckle (not shown) may be used to partially fix the position of the linear temperature sensor 310.

Therefore, according to this configuration of the present disclosure, since the battery pack 400 includes the linear temperature sensor 310 linearly extending along at least two battery modules 200, it is possible to reduce the manufacturing cost of the battery pack.

That is, when a plurality of temperature sensors is provided in the prior art, a plurality of temperature sensors and separate signal wires for connecting the plurality of temperature sensors are required, which increases the manufacturing cost due to high material cost and long installation work. Meanwhile, the battery pack 400 of the present disclosure uses only one linear temperature sensor 310 to detect the temperature of the plurality of battery modules 200, so a separate signal wire is not required and easy installation is secured due to a light and flexible design. Thus, the manufacturing cost of battery pack 400 may be greatly reduced.

Moreover, the linear temperature sensor 310 is useful for setting a plurality of points for more accurate temperature sensing even for one battery module 200. Accordingly, in the present disclosure, it is possible to greatly reduce the failure rate in detecting the occurrence of fire in the battery module 200.

Figure 4:
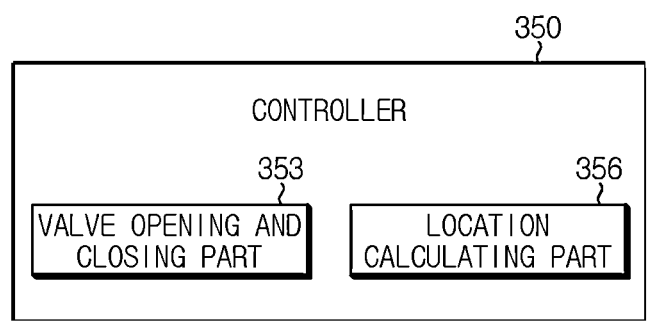
FIG. 4 is a diagram schematically showing some components of a fire extinguishing unit, employed at the battery pack according to an embodiment of the present disclosure.

FIG. 4 is a diagram schematically showing some components of a fire extinguishing unit, employed at the battery pack according to an embodiment of the present disclosure.

Referring to FIG. 4 along with FIG. 3, the fire extinguishing unit 300 may include a controller 350. More specifically, the controller 350 may include a valve opening and closing part 353 and a location calculating part 356.

Specifically, the valve opening and closing part 353 may be configured to open the valve 340 when the linear temperature sensor 310 senses a temperature over the predetermined temperature. For example, when the valve 340 is an active valve, the valve opening and closing part 353 may be configured to transmit a signal for controlling the active valve.

In addition, the location calculating part 356 may be configured to receive a signal from the linear temperature sensor 310 and calculate a location of the battery module 200 over the predetermined temperature. More specifically, the location calculating part 356 may analyze the signal received from the linear temperature sensor 310. In addition, the location calculating part 356 may calculate the location to identify which battery module 200 among the at least two battery modules 200 is heated over the predetermined temperature.

For example, if a temperature over the predetermined temperature is detected in a part of the entire length of the linear temperature sensor 310, the location calculating part 356 may estimate the battery module 200 at which thermal runaway occurs by calculating the distance between the detected part of the linear temperature sensor 310 and the fire extinguishing unit 300.

Figure 5:
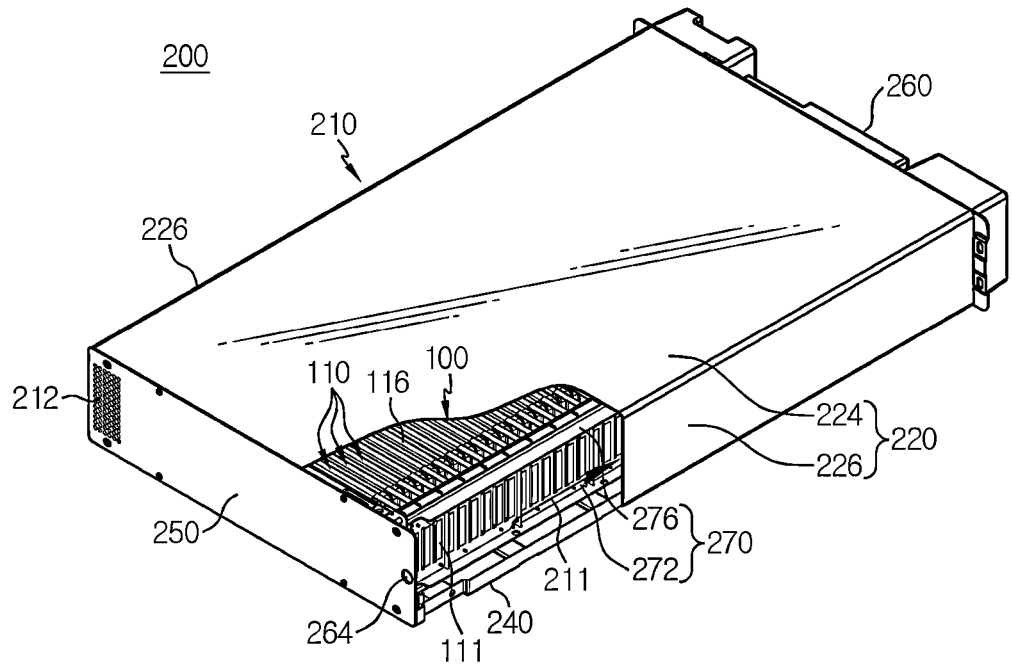
FIG. 5 is a rear perspective view schematically showing a partial internal structure of a battery module, employed at the battery pack according to an embodiment of the present disclosure.

FIG. 5 is a rear perspective view schematically showing a partial internal structure of a battery module, employed at the battery pack according to an embodiment of the present disclosure.

Referring to FIG. 5, the battery module 200 according to an embodiment of the present disclosure may include at least two cell assemblies 100 and a module housing 210.

Each of the at least two cell assemblies 100 may include a plurality of secondary batteries 110 stacked in a front and rear direction. The secondary battery 110 may be a pouch-type secondary battery 110. For example, as shown in FIG. 5, when viewed in the F direction of FIG. 1 (from the front), each of the two cell assemblies 100 may be configured such that a plurality of pouch-type secondary batteries 110 are stacked side by side in the front and rear direction.

Meanwhile, in this specification, unless otherwise specified, the upper, lower, front, rear, left and right directions will be set based on when viewed in the F direction.

In particular, the pouch-type secondary battery 110 may include an electrode assembly (not shown), an electrolyte solution (not shown), and a pouch 116.

Moreover, a positive electrode lead 111 and a negative electrode lead (not shown) may be formed at left and right ends of the secondary battery 110, which are opposite to each other based on the center of the secondary battery 110. That is, the positive electrode lead 111 may be provided at one end of the secondary battery 110 based on the center thereof. In addition, the negative electrode lead may be provided at the other end of the secondary battery 110 based on the center thereof.

However, the battery module 200 according to the present disclosure is not limited to the pouch-type secondary battery 110 described above, and various kinds of secondary batteries known at the time of filing of this application may be employed.

Meanwhile, referring to FIG. 5 again, the battery module 200 may further include a bus bar assembly 270. Specifically, the bus bar assembly 270 may include at least one bus bar 272 configured to electrically connect the plurality of secondary batteries 110 to each other and at least two bus bar frame 276 configured to mount the at least at least one bus bar 272 at an outer side. The at least two bus bar frame 276 may be provided at left and right sides of the cell assembly 100, respectively.

Meanwhile, the module housing 210 may have an inner space to accommodate the cell assembly 100 therein. Specifically, when viewed directly in the F direction of FIG. 1, the module housing 210 may include an upper cover 220, a base plate 240, a front cover 260, and a rear cover 250.

Specifically, the base plate 240 may have an area larger than the size of a bottom surface of the at least two cell assemblies 100 so as to mount the at least two cell assemblies 100 to an upper portion thereof. The base plate 240 may have a plate shape extending in a horizontal direction.

Here, the horizontal direction may refer to a direction parallel to the ground when the battery module 200 is placed on the ground, and may also refer to at least one direction on a plane perpendicular to the upper and lower direction.

In addition, the upper cover 220 may include an upper wall 224 and a sidewall 226 extending downward from the upper wall 224. The upper wall 224 may have a plate shape extending in a horizontal direction to cover an upper portion of the cell assembly 100. The sidewall 226 may have a plate shape extending downward from both left and right ends of the upper wall 224 to cover both left and right sides of the cell assembly 100.

In addition, the sidewall 226 may be coupled to a portion of the base plate 240. For example, as shown in FIG. 5, the upper cover 220 may include an upper wall 224 having a plate shape extending in the front, rear, left and right directions. The upper cover 220 may include two sidewalls 226 extending downward from both left and right ends of the upper wall 224, respectively. Further, lower ends of the two sidewalls 226 may be configured to be coupled with both left and right ends of the base plate 240, respectively. In this case, the coupling method may be a male and female coupling method or a welding method.

Moreover, the front cover 260 may be configured to cover the front side of the plurality of secondary batteries 110. For example, the front cover 260 may have a plate shape larger than the size of the front surface of the plurality of secondary batteries 110. The plate shape may be erected in a vertical direction.

In addition, the rear cover 250 may be configured to cover the rear side of the cell assembly 100. For example, the rear cover 250 may have a plate shape larger than the size of the rear surface of the plurality of secondary batteries 110.

Moreover, the module housing 210 may have a gas passage 211 through which the gas generated from the cell assembly 100 flows. Here, the gas passage 211 may be a space elongated in the front and rear direction to communicate with the outside. The gas passage 211 may be provided at one of the left and right sides or both left and right sides of the cell assembly 100.

More specifically, the gas passage 211 may be a space between the upper or lower portion of the cell assembly 100 and the module housing 210. That is, the gas generated from the cell assembly 100 accommodated in the battery module 200 may move to both left and right sides of the cell assembly 100 through the gas passage 211 located at the upper or lower portion of the cell assembly 100 and be discharged out through a plurality of gas discharge holes 212 formed at the end of the gas passage 211 and perforated to communicate with the outside of the battery module 200.

Figure 6:
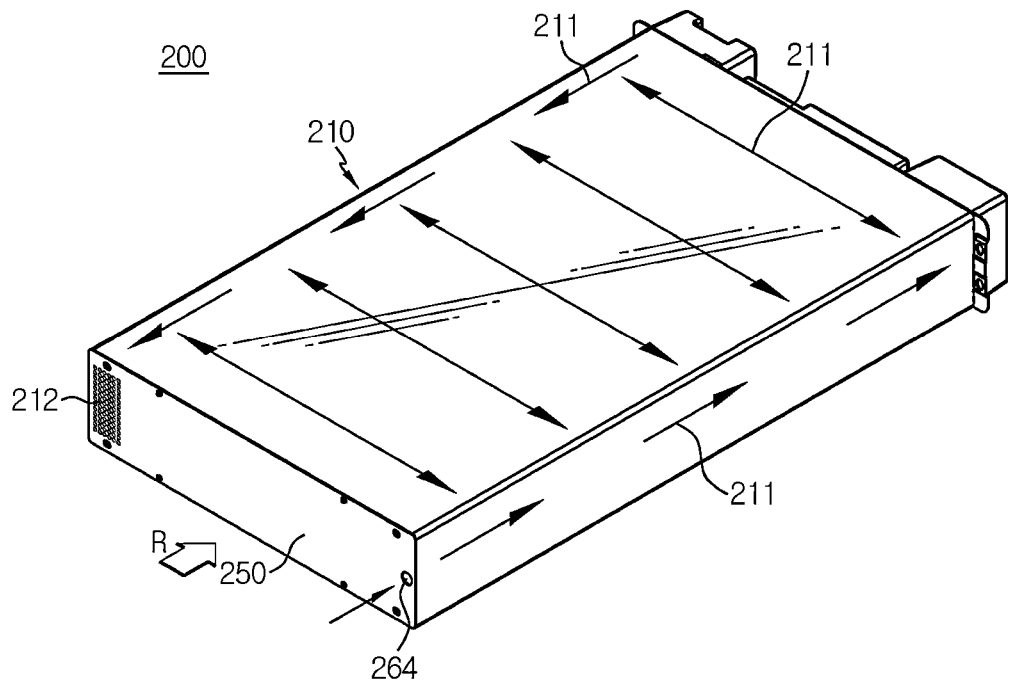
FIG. 6 is a rear perspective view schematically showing the battery module, employed at the battery pack according to an embodiment of the present disclosure.

FIG. 6 is a rear perspective view schematically showing the battery module, employed at the battery pack according to an embodiment of the present disclosure. Also, FIG. 7 is a front perspective view schematically showing the battery module, employed at the battery pack according to an embodiment of the present disclosure.

Figure 7:
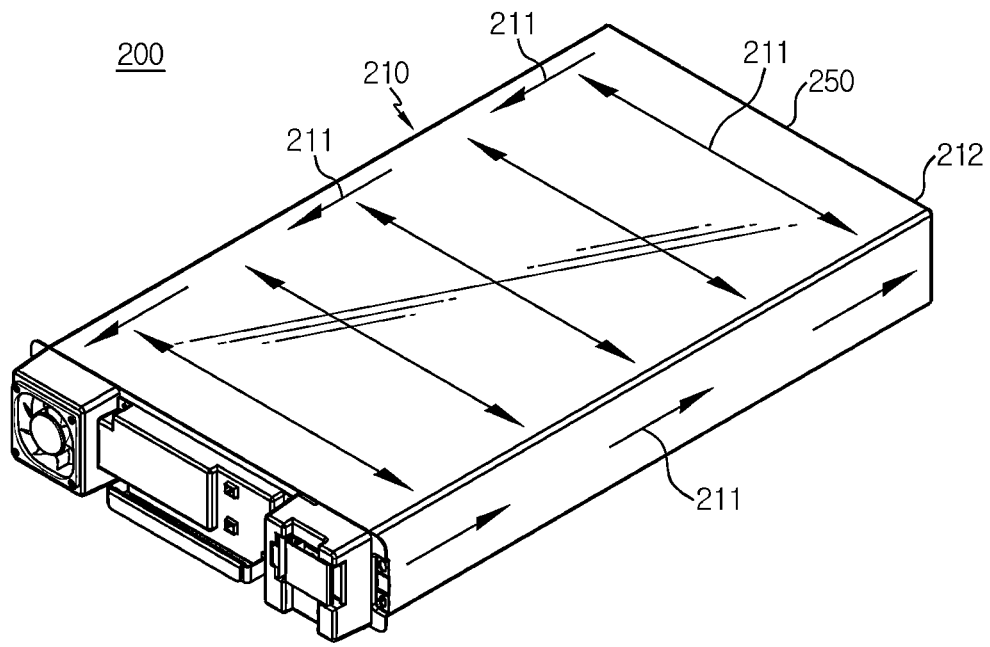
FIG. 7 is a front perspective view schematically showing the battery module, employed at the battery pack according to an embodiment of the present disclosure.

Referring to FIGS. 6 and 7 along with FIG. 5, an inlet hole 264 may be provided at the rear cover 250 located at the rear side of each of the at least two battery modules 200 so that the fire extinguishing agent is introduced therethrough. The inlet hole 264 may be positioned to communicate with the gas passage 211. That is, the inlet hole 264 may be configured to communicate with the gas passages 211 located on both left and right sides based on the cell assembly 100.

For example, when viewed in the R direction of FIG. 6, the inlet hole 264 may be provided at the right side of the rear cover 250. In addition, the fire extinguishing agent introduced through the inlet hole 264 may move along the gas passage 211 located at the left side of the cell assembly 100, and subsequently, the fire extinguishing agent may move to the gas passage 211 located at the right side of the cell assembly 100 through the gas passage 211 located at the upper or lower portion of the cell assembly 100. Through this process, it is possible to extinguish and cool the ignited or overheated cell assembly 100 inside the battery module 200.

Figure 8:
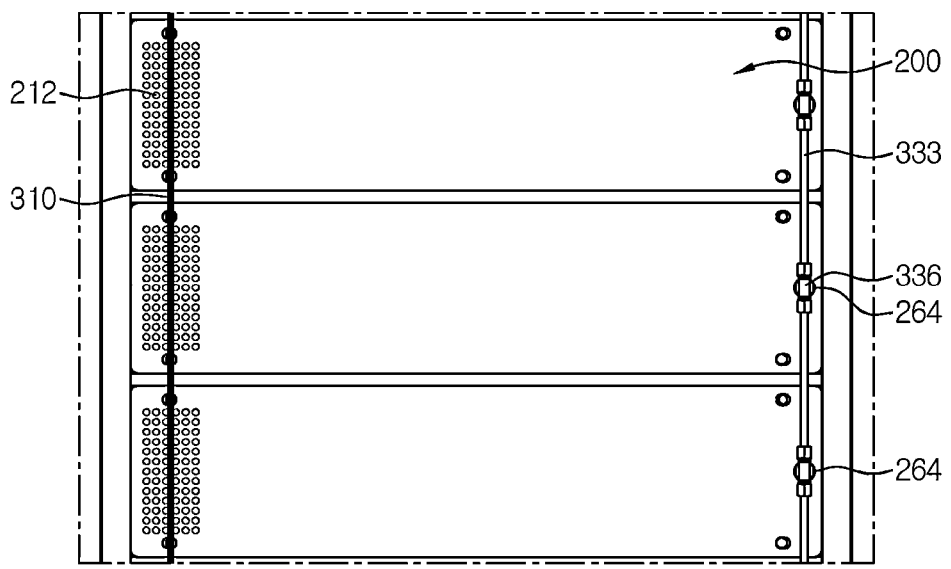
FIG. 8 is a partial rear view schematically showing a portion of the battery pack according to an embodiment of the present disclosure.

FIG. 8 is a partial rear view schematically showing a portion of the battery pack according to an embodiment of the present disclosure.

Referring back to FIG. 8 along with FIG. 5, the linear temperature sensor 310 may be positioned so that a part of the linear temperature sensor 310 faces the gas discharge hole 212 provided to each of the at least two battery modules 200. For example, as shown in FIG. 8, the gas discharge hole 212 may be provided to the rear cover 250 of each of the two or more battery modules 200 stacked in the vertical direction. In addition, the linear temperature sensor 310 may be disposed at the outer side of each of the two or more battery modules 200 to face the gas discharge hole 212.

Therefore, according to this configuration of the present disclosure, if a part of the linear temperature sensor 310 is located at the outer side of the two or more battery modules 200 to face the gas discharge hole 212 provided to each of the at least two battery modules 200, when thermal runaway occurs at the cell assembly 100 of the battery module 200, hot air with elevated temperature is discharged through the gas discharge hole 212 or hot gas generated during ignition of the cell assembly is discharged through the gas discharge hole 212, so the linear temperature sensor 310 may sense the hot air or gas with fast response. Accordingly, it is possible to increase the stability by rapidly responding to the thermal runaway of the battery pack 400 according to the present disclosure.

Figure 9:
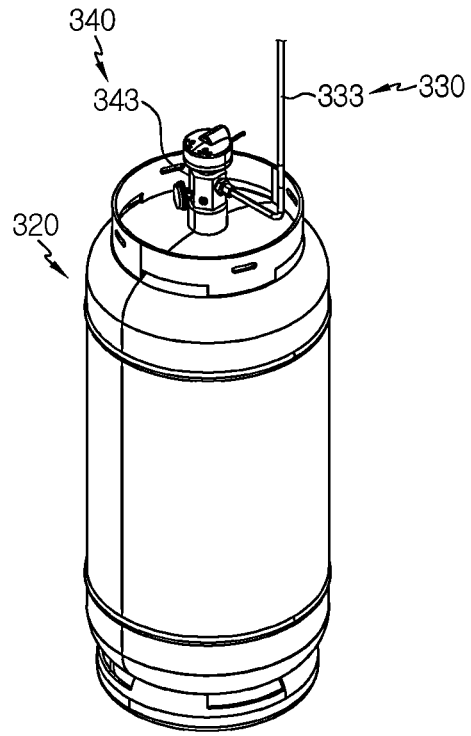
FIG. 9 is a partial perspective view schematically showing a portion of the battery pack according to an embodiment of the present disclosure.

FIG. 9 is a partial perspective view schematically showing a portion of the battery pack according to an embodiment of the present disclosure.

Referring to FIG. 9 along with FIG. 7, the valve 340 may include a common valve 343 located at a part of the common pipe 333 to open or close the common pipe 333, and a distribution valve 346 located at a part of the distribution pipe 336 to open or close the distribution pipe 336.

For example, the common valve 343 may be an active valve capable of controlling the opening and closing of the valve 340 by receiving a signal from the valve opening and closing part of the fire extinguishing unit 300. For example, when at least one of the at least two battery modules 200 is heated over the predetermined temperature, the temperature is detected by the location calculating part 356 of the fire extinguishing unit 300, and the valve opening and closing part 353 may transmit an open signal to the common valve 343 to open the common valve 343 so that the extinguishing agent may be discharged from the fire extinguishing tank 320. For example, the active valve may be a control valve, a motor-operated valve, a solenoid valve, or a pneumatic valve.

Figure 10:
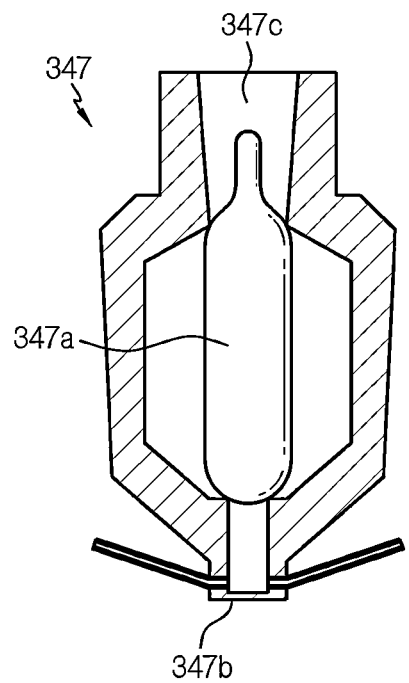
FIG. 10 is a sectional view schematically showing of an internal configuration of a portion of the battery pack according to an embodiment of the present disclosure.

FIG. 10 is a sectional view schematically showing of an internal configuration of a portion of the battery pack according to an embodiment of the present disclosure.

Referring to FIG. 10 along with FIG. 8, the distribution valve 346 may be a passive valve 347 configured to be opened so that the fire extinguishing agent may be injected into the battery module 200 over the predetermined temperature. For example, the passive valve 347 may be configured to open the valve 340 when the internal temperature of the battery module 200 is over the predetermined temperature. For example, the passive valve 347 may include a glass bulb 347a and a predetermined fluid (not shown) accommodated in the glass bulb 347a. The glass bulb 347a may be configured to seal a passage 347c of the passive valve 347 through which the fluid flows.

In addition, the glass bulb 347a may be configured to be broken by volume expansion of the predetermined liquid over the predetermined temperature, for example 70° C. to 100° C. That is, if the passive valve 347 is located inside the battery module 200, when the internal temperature of the battery module 200 rises over the predetermined temperature, the glass bulb 347a blocking the passage 347c of the valve 340 through which the fluid flows may be broken open the passage 347c of the valve. Further, the passive valve 347 may further include a sprinkler head 347b having a dispersion pin to disperse the discharged fluid in all directions.

Figure 11:
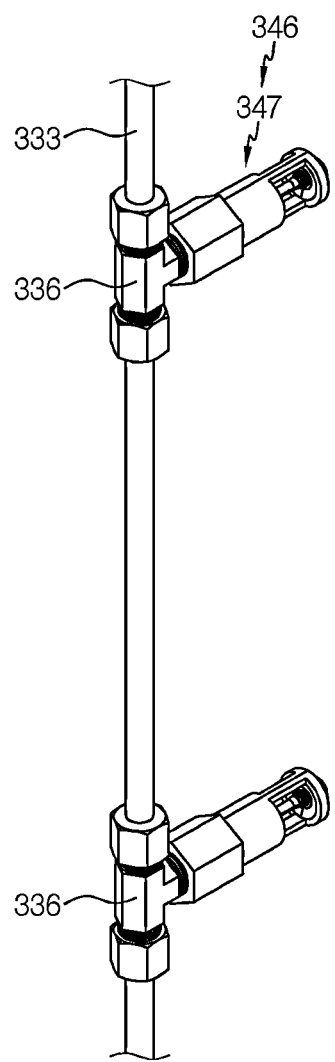
FIG. 11 is a partial perspective view schematically showing a pipe and a valve, employed at the battery pack according to an embodiment of the present disclosure.

FIG. 11 is a partial perspective view schematically showing a pipe and a valve, employed at the battery pack according to an embodiment of the present disclosure.

Referring to FIG. 11 along with FIGS. 5 and 8, the passive valve 347 may be configured to be at least partially inserted into the inlet hole 264 configured to communicate with the gas passage 211 provided to the battery module 200. For example, the pipe 330 may include a plurality of distribution pipes 336 along the common pipe 333, and the distribution pipe 336 may be a Tee pipe or an elbow pipe. In addition, the distribution valve 346 may have provided at the distal end of the distribution pipe 336. The distribution valve 346 may be the passive valve 347. For example, the passive valve 347 may include a glass bulb and a sprinkler head. In addition, at least a part of the distribution valve 346 may be inserted into the inlet hole 264 configured to communicate with the gas passage 211 provided to the battery module 200.

Therefore, according to this configuration of the present disclosure, since at least a part of the passive valve 347 is inserted into the inlet hole 264 perforated to communicate with the gas discharge passage provided to the battery module 200, when thermal runaway occurs, the passive valve 347 opens so that the fire extinguishing agent may be injected individually only to the battery module at which the thermal runaway occurs. Moreover, since the fire extinguishing agent may be injected directly into the battery module 200, rather than to an outside thereof, it is possible to effectively extinguish and cool the fire of the battery module 200 at which thermal runaway occurs.

Figure 12:
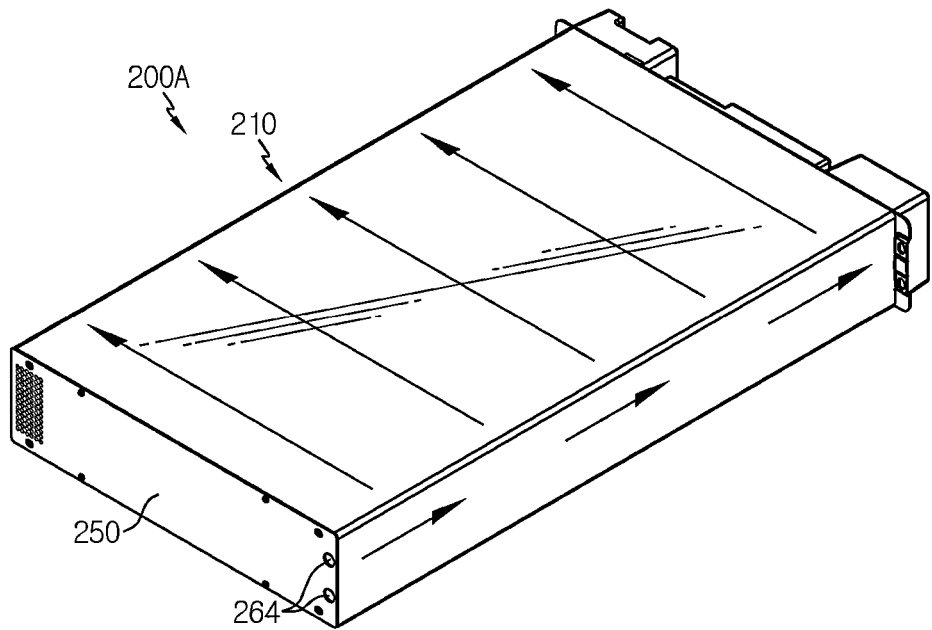
FIG. 12 is a rear perspective view schematically showing a battery module, employed at a battery pack according to another embodiment of the present disclosure.

FIG. 12 is a rear perspective view schematically showing a battery module, employed at a battery pack according to another embodiment of the present disclosure. Also, FIG. 13 is a partial perspective view schematically showing a pipe and a valve, employed at the battery pack according to another embodiment of the present disclosure.

Figure 13:
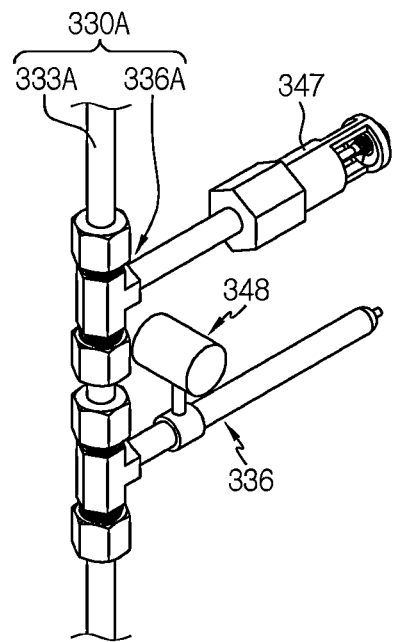
FIG. 13 is a partial perspective view schematically showing a pipe and a valve, employed at the battery pack according to another embodiment of the present disclosure.

Referring to FIGS. 12 and 13 along with FIGS. 3 and 4, a battery module 200A of another embodiment may have two or more inlet holes 264. A distribution pipe 336A may be connected to each of the two or more inlet holes 264. Any one of the two distribution pipes 336A may include the passive valve 347 that is opened when the battery module 200A is heated over the predetermined temperature. The passive valve 347 may be configured to be opened so that the fire extinguishing agent may be injected into the battery module 200A over the predetermined temperature. For example, the passive valve 347 may be configured to be opened when the internal temperature of the battery module 200A increases over the predetermined temperature. The passive valve 347 may be located at the distal end of the distribution pipe 336A so that at least a part of the passive valve 347 may be inserted into the inlet hole 264.

In addition, as shown in FIG. 13, a pipe 330A of the battery pack according to another embodiment includes a common pipe 333A and at least two or more distribution pipes 336A connected to the common pipe 333A. At this time, one of the two distribution pipes 336A may be connected to the passive valve 347, and the other of the two distribution pipes 336A may be connected to the active valve 348 that is opened when the battery module 200A is heated over the predetermined temperature.

The active valve 348 may be configured to be opened when the linear temperature sensor 310 senses a battery module 200A over the predetermined temperature. For example, as shown in FIGS. 4 and 13, the active valve 348 may be configured to operate by receiving an opening and closing signal from the valve opening and closing part 353 (FIG. 4) of the controller 350 of the fire extinguishing unit 300. The active valve 348 may be, for example, a motor valve or a solenoid valve.

Therefore, according to this configuration of the present disclosure, since one of the two distribution pipes 336A includes the passive valve 347 opened when the battery module 200A is heated over the predetermined temperature and the other of the two distribution pipes 336A includes the active valve 348, even if the passive valve 347 is not opened when thermal runaway occurs at the battery module 200A, the fire extinguishing unit 300 may transmit a signal to the active valve 348 to be opened, thereby increasing the safety of the battery pack 400.

Figure 14:
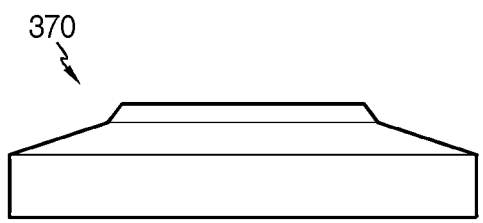
FIGS. 14 and 15 are a front view and a plan view schematically showing a smoke sensor, employed at the battery pack according to an embodiment of the present disclosure.
Figure 15:
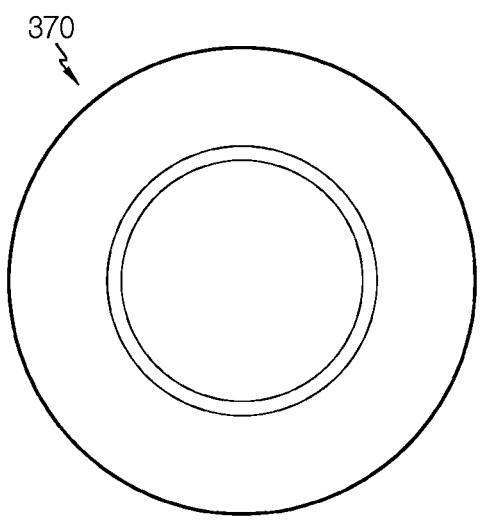

FIGS. 14 and 15 are a front view and a plan view schematically showing a smoke sensor, employed at the battery pack according to an embodiment of the present disclosure.

Referring to FIGS. 14 and 15 along with FIG. 3, the fire extinguishing unit 300 may further include a smoke sensor 370 configured to sense a smoke discharged from the at least two battery modules 200. Specifically, the smoke sensor 370 may be located at an uppermost portion T (FIG. 1) of the at least two battery modules 200 stacked in the vertical direction. That is, if a fire occurs in the battery module 200, the generated gas may be moved upward, so it is preferable that the smoke sensor 370 is located at the uppermost portion T (FIG. 1) of the at least two battery modules 200.

In addition, the smoke sensor 370 may be configured to transmit a signal to the controller 350 of the fire extinguishing unit 300 when detecting smoke. The controller 350 may allow the valve opening and closing part 353 to open the common valve 343 and/or the distribution valve 346 according to the received signal.

Figure 16:
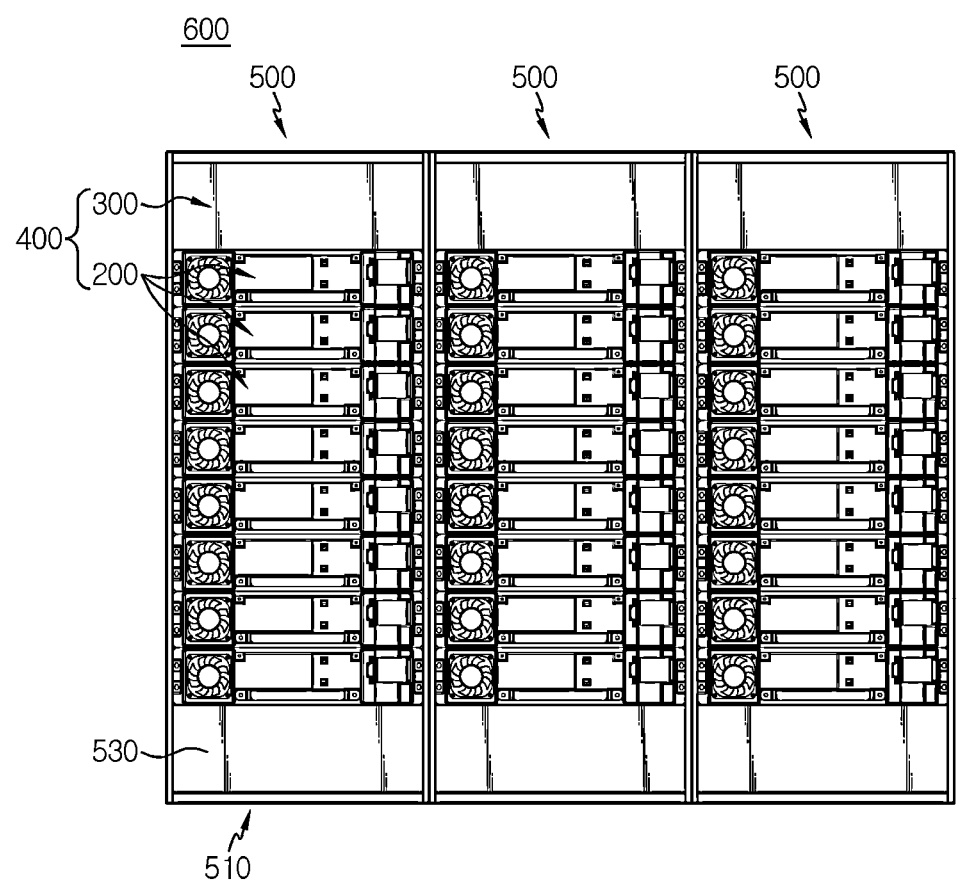
FIG. 16 is a front view schematically showing an energy storage system according to an embodiment of the present disclosure.

FIG. 16 is a front view schematically showing an energy storage system according to an embodiment of the present disclosure.

Referring to FIG. 16, a battery rack 500 according to an embodiment of the present disclosure may include the battery pack 400 and a rack case 510 for accommodating the battery pack 400. The rack case 510 may also be configured to accommodate the battery pack 400 in a state where a plurality of battery modules 200 are vertically stacked. Inside the rack case 510, the battery module 200 may be mounted such that its lower surface is in a parallel shape to the horizontal surface.

Moreover, the rack case 510 is configured to have at least one side openable, and the battery module 200 may be inserted into the inner space through the open side. However, the rack case 510 may also be configured to allow such an open side to be closed.

In addition, the battery rack 500 may further include a battery management system 530 (BMS) or the like.

Meanwhile, an energy storage system 600 according to an embodiment of the present disclosure may include two or more battery racks 500. The two or more battery racks 500 may be arranged in one direction. For example, as shown in FIG. 16, the energy storage system 600 may be configured such that three battery racks 500 are arranged in one direction. In addition, the energy storage system 600 may have a central controller (not shown) capable of controlling charging and discharging of three battery racks 500.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| Reference Signs | |
| --- | --- |
| 200: battery module | 100: cell assembly |
| 110: secondary battery | 210: module housing |
| 211: gas passage | 212: gas discharge hole |
| 264: inlet hole | |
| 300: fire extinguishing unit | 310: linear temperature sensor |
| 320: fire extinguishing tank | 321: outlet hole |

| Reference Signs |
|---|
| 330, 333, 336: pipe, common pipe, distribution pipe |
| 340, 343, 346: valve, common valve, distribution valve |
| 350, 353, 356: controller, valve opening and closing part, location calculating part |
| 370: smoke sensor |
| 400: battery pack    500: battery rack |
| 510: rack case |
| 600: energy storage system |

INDUSTRIAL APPLICABILITY

The present disclosure relates to a battery pack. In addition, the present disclosure is available for industries associated with a battery rack including the battery pack, and a large-scale energy storage system including a plurality of battery racks.

What is claimed is:

1. A battery pack, comprising:
at least two battery modules arranged in one direction;
a fire extinguisher;
a fire extinguishing tank configured to accommodate a fire extinguishing agent;
a pipe connected to the fire extinguishing tank to supply the fire extinguishing agent from the fire extinguishing tank to each of the at least two battery modules;
a temperature sensor measuring the temperature of each of the at least two battery modules; and
a valve to supply the fire extinguishing agent from the fire extinguishing tank to the at least one battery module having a temperature over a predetermined temperature,
wherein the pipe includes a common pipe connected to an outlet hole of the fire extinguishing tank through which the fire extinguishing agent is output, and a distribution pipe having a distributed structure to be connected from the common pipe to an inlet hole of each of the at least two battery modules through which the fire extinguishing agent is input,
wherein the valve includes a common valve located in the common pipe to open or close the common pipe, and a distribution valve located in the distribution pipe to open or close the distribution pipe, and
wherein the distribution valve is a passive valve configured to be opened to inject the fire extinguishing agent into the battery module over the predetermined temperature.

2. The battery pack according to claim 1, wherein the temperature sensor is a linear temperature sensor partially extending linearly along the at least two battery modules and configured to sense whether at least one of the at least two battery modules has a temperature over a predetermined temperature.

3. The battery pack according to claim 2, wherein each of the at least two battery modules has a gas passage configured to discharge a gas generated therein to the outside, and a plurality of gas discharge holes formed at an end of the gas passage to communicate with the outside, and
wherein a part of the linear temperature sensor is located at an outer side of the two or more battery modules to face the gas discharge holes respectively provided to the at least two battery modules.

4. The battery pack according to claim 1, wherein at least a part of the passive valve is inserted into the inlet hole, and
wherein the inlet hole is formed to communicate with the gas passage provided to the battery module.

5. The battery pack according to claim 2, wherein the common valve is an active valve configured to be opened when the linear temperature sensor senses the at least one battery module having a temperature over the predetermined temperature.

6. The battery pack according to claim 2, wherein the fire extinguisher further includes a location calculating part configured to receive a signal from the linear temperature sensor and calculate a location of the at least one battery module having a temperature over the predetermined temperature.

7. The battery pack according to claim 1, wherein each of the at least two battery modules has two inlet holes,
wherein the distribution pipe is two distribution pipes respectively connected to the two inlet holes,
wherein a first distribution pipe of the two distribution pipes includes a passive valve configured to be opened when the at least one battery module is heated over the predetermined temperature, and
wherein a second distribution pipe of the two distribution pipes includes an active valve configured to be opened when the at least one battery module is heated over the predetermined temperature.

8. The battery pack according to claim 1, wherein the fire extinguisher further includes a smoke sensor configured to sense a smoke discharged from the at least two battery modules.

9. A battery rack, comprising:
a battery pack according to claim 1; and
a rack case configured to accommodate the battery pack.

10. An energy storage system, comprising two or more battery racks according to claim 9.

* * * * *